(12) United States Patent
Menin

(10) Patent No.: US 6,305,189 B1
(45) Date of Patent: Oct. 23, 2001

(54) METHOD AND INSTALLATION FOR CONTINUOUS CRYSTALLIZATION OF LIQUIDS BY FREEZING

(75) Inventor: Boris Menin, Beer-Sheva (IL)

(73) Assignee: Crytec, Ltd., Kiryat Gat (IL)

( * ) Notice: Subject to any disclaimer, the term of this patent is extended or adjusted under 35 U.S.C. 154(b) by 0 days.

(21) Appl. No.: 09/635,423

(22) Filed: Aug. 10, 2000

Related U.S. Application Data

(60) Provisional application No. 60/155,772, filed on Sep. 27, 1999.

(51) Int. Cl.$^7$ ............................... B01D 9/04; C02F 1/22
(52) U.S. Cl. .............................................. 62/544; 62/354
(58) Field of Search ............................. 62/532, 544, 545, 62/354, 342, 343

(56) References Cited

U.S. PATENT DOCUMENTS

| | | | |
|---|---|---|---|
| 3,277,667 | 10/1966 | Hendrick | 62/343 |
| 4,112,702 | 9/1978 | Smirnov et al. | 62/123 |
| 4,185,352 * | 1/1980 | Smith | 15/246.5 |
| 4,241,590 * | 12/1980 | Martineau | 62/343 |
| 4,405,349 | 9/1983 | Mukherjee | 62/532 |
| 4,445,429 | 5/1984 | Czyzewski et al. | 99/455 |
| 4,459,144 | 7/1984 | Van Pelt et al. | 62/541 |
| 4,758,097 * | 7/1988 | Iles | 366/149 |
| 4,831,839 | 5/1989 | Anderson et al. | 62/308 |
| 4,912,935 | 4/1990 | Goldstein | 62/123 |
| 4,936,114 | 6/1990 | Engdahl | 62/532 |
| 4,964,542 | 10/1990 | Smith | 222/146.6 |
| 5,174,859 | 12/1992 | Rittof et al. | 162/29 |
| 5,383,342 | 1/1995 | El-Boher et al. | 62/532 |
| 5,485,880 | 1/1996 | Zeuthen | 165/94 |
| 5,518,067 | 5/1996 | Finch et al. | 165/92 |
| 5,575,160 | 11/1996 | Keus | 62/544 |
| 5,709,095 | 1/1998 | Johnson | 62/136 |
| 5,755,106 | 5/1998 | Ross | 62/217 |
| 5,967,226 * | 10/1999 | Choi | 165/63 |
| 6,119,467 | 9/2000 | Zusman et al. | 62/69 |

FOREIGN PATENT DOCUMENTS

| | | | |
|---|---|---|---|
| 99/26486 | 6/1999 | (WO) | A23G/9/20 |
| WO-99/26486-A * | 6/1999 | (WO) | 62/69 |

* cited by examiner

*Primary Examiner*—William C. Doerrler
(74) *Attorney, Agent, or Firm*—McDermott, Will & Emery

(57) ABSTRACT

An installation is described for continuous crystallization of liquids by freezing. The installation performs liquid preliminary cooling under predetermined temperature; adding gas into cooled liquid and their intermixing; delivering mixed liquid and gas through the refrigerated evaporator; winding round mixed liquid and gas into the refrigerated evaporator; a pumpless refrigeration circuit, including compressor, water condenser, cooling tower, indirect refrigerated evaporator, expansion valve, low pressure receiver and required refrigeration accessories, for the realization of cooling volumetric crystallization of liquid flowing through the refrigerated evaporator. These processes cause the formation of a bubble slurry with crystal nuclei, gas bubbles and concentrated, unfrozen liquid; preparation means are described for transportation and further storage or use of bubble slurry; immovable means are designed for feasible separation of pure fine crystals and mother concentrated liquid.

22 Claims, 5 Drawing Sheets

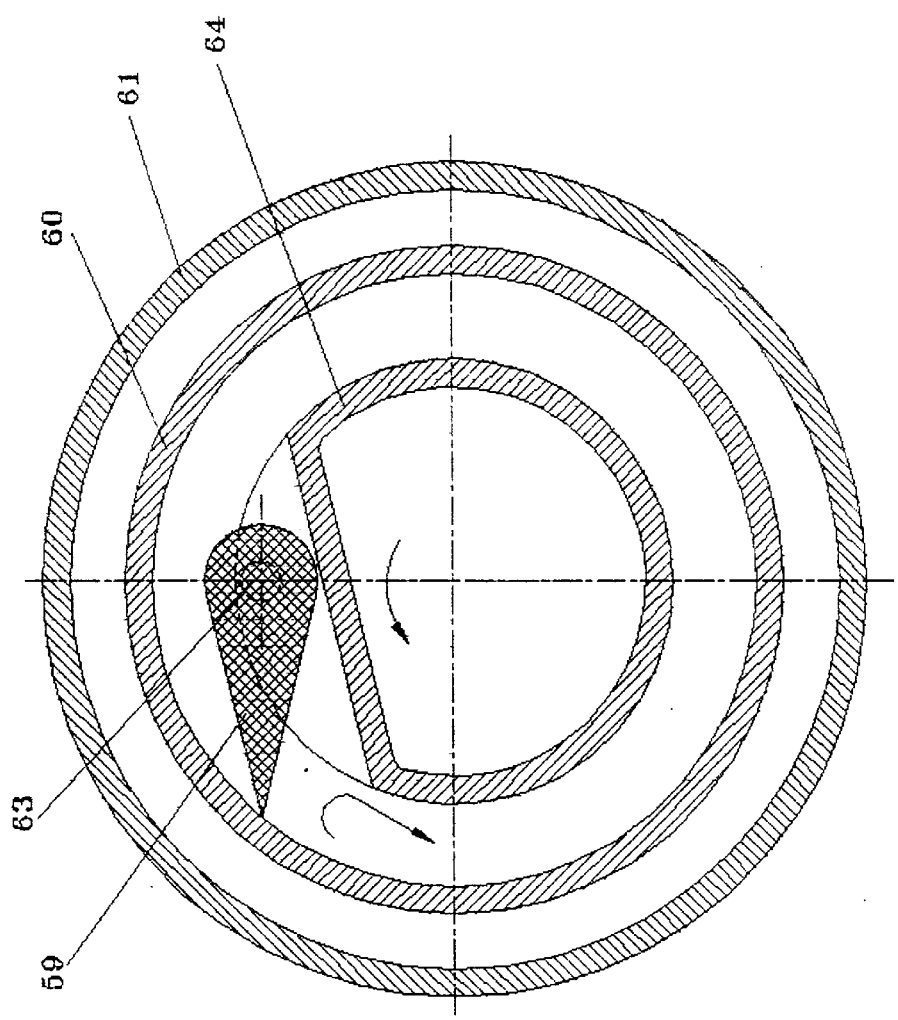

METHOD AND INSTALLATION FOR CONTINUOUS CRYSTALLIZATION OF LIQUIDS BY FREEZING

This application claims priority of provisional U.S. application No. 60/155,772, filed on Sep. 27, 1999.

FIELD OF THE INVENTION

The present invention relates to a method and installation for the continuous crystallization of liquids by freezing.

BACKGROUND ART

The extraction of a solid phase like crystals from saturated liquids is named crystallization. The chemical composition of crystals is different compared to a mother liquid. This characteristic of crystals is used for large scale separation, ultra purification and suspension processes.

In industrial applications crystallization is, after distillation, the most commonly applied technological technique. It includes an extraction of dissolved one component from liquid, the concentration simultaneously of all dissolved substances by solvent crystallization (cryoconcentration), production of required consistence foods (i.e. ice cream).

The over saturated liquid can be prepared by increase of concentration or by cooling. In order to increase the liquid's concentration there are several widely used, commercialized methods including a thermal process, vapor compression, membrane (reverse osmosis), a combination of mentioned processes.

The main disadvantages of membrane's technologies are a high value of energy expenditure for the liquid passing through membranes and their expensive price. The vapor compression equipment and thermal process plants are cumbersome because of very low effectiveness of these heat transfer processes and very high value of energy expenditure for evaporation (597kcal/kg=2500kJ/kg).

The equipment in which the cooling causes a liquid over saturation is named a cooled crystallizer. It is, may be, periodic or continuous type, direct or indirect type.

In generall, the continuous indirect type cooled crystallizer is a well-known scraped surface crystallizer (SSC). It consists of cooled cylinder (evaporator) with a knife arrangement cutting produced crystals from the cooled surface of SSC. If a cylinder revolves, a knife (mill) is fixed. In turn, into an immovable evaporator there is a revolved scraper or shaft with knives. Because of a clearance between cooled surface and the edge of knife or scraper a crystal layer of the treated material covers always a heat transfer surface. It causes a sharp decreasing of heat flow through cylinder and a drop of its capacity. Besides that the adhesion force between knife and a crystal ice layer increases the energy expenditure of a shaft engine and as consequence a cross-section of cylinder is corked up for the passed liquid. In order to prevent this phenomena the construction of SSC is complicated by different defense arrangements. The energy expenditure for these techniques equals about (100 kcal/kg=419 kJ/kg).

An apparatus of freeze crystallization for the removal of water from a solution of dissolved solids, as seen in U.S. Pat. No. 5,575,160 shows that a liquid, passing through a freeze crystallizer, is cooled by direct contact with cooling surface (ice crystal nuclei moved from the inside surface throughout the entire volume of the tubular element). The crystallizer, which converts the initial feed stream into a slurry of ice and concentrate, includes a SSC that produces, pumps and removes an ice slurry and uses a secondary cooling system. A mixture of concentrated liquid and ice crystals, after SSC, is separated and ice crystals are continuously discharged from the ice separator.

However, the method according to the above patent is highly inefficient, because of the clogging of the entire tubular element volume. The scrapers revolve on their shaft causing a mass of liquid to be forced from the shaft in all directions to the cooling surface. The ice crystals, in turn, speed to the axis of the outer shell, due to the existing difference between densities of ice and liquid. New portions of ice continuously press and envelope the revolving shaft. This phenomena causes a decrease of crystallizer's cross-section and a stop of a working mode.

The effectiveness of freezing and the ability to separate ice crystals and mother liquor are dramatically reduced in case of highly contaminated liquid feed streams, because the produced ice crystals are relatively small and therefore a centrifugal action is low.

A further serious disadvantage of the above mentioned method is the fact that the known crystallizer is very inefficient because of the low value of heat transfer coefficient (not more than 400 W/(m$^2$·K)) from a coolant (brine) to the feed stream. That's why in comparison to other feed techniques (i.e. pumpless overfeed refrigerant system) this method requires the larger heat transfer surface (by 50÷100%), constant attention to the stability of the feed stream flow and compressor protection on the refrigerant side.

Moreover, there is large energy consumption by ice forming on the inside surface of the crystallizer's outer shell because an every new frozen ice layer creates additional heat impedance for the next ice layer. It makes it necessary to decrease the refrigerant evaporating temperature. For example, for the partially-crystallized slurry, which may have an ice fraction of 50% from the treated liquid with the crystallization temperature of minus 3° C., it is needed an its final highest temperature of minus 6° C. {[1-(−3° C. /−6° C.)]×100%=50%}. In case of stainless steel crystallizer's shell and stainless steel body of brine cooler the smallest temperature drop between the treated liquid and boiled refrigerant will be about (15÷5.20)° C. The growing of ice layer on the cooled surface of the crystallizer causes the refrigerant evaporating temperature decrease of about 10° C. At the same time every 1° C. reduction of the evaporating temperature corresponds to 4% cold capacity decreasing. It means that the 10° C. drop of evaporating temperature leads to 40% decreasing of compressor cooling capacity and correspondingly to the 20÷30% increasing of energy consumption by the compressor.

DISCLOSURE OF THE INVENTION

The present invention overcomes the drawbacks and disadvantages of the prior art and provides a method and installation for the realization of a liquid continuous crystallization by freezing which enables production bubble slurry mixture into liquid volume, consumes less energy, allows separation crystals from concentrated liquid with high effectiveness, supports transportation of bubble slurry without additional pumping means, is more environment friendly and economical attractive.

In accordance with one aspect of the invention, a system for providing continuous three-dimensional crystallization of liquid comprises a liquid supply circuit for supplying the liquid, a mixer supplied with the liquid and a preselected gas for producing a mixture of the liquid with the gas, and a crystallizer supplied with the mixture of the liquid and the gas for performing three-dimensional crystallization of the mixture to produce ice crystals. The liquid supply circuit may comprise a cooling device for pre-cooling the liquid before supplying the liquid to the mixer.

In a preferred embodiment of the invention, the crystallizer may comprise at least one evaporator including a rotating device for rotating the mixture of the liquid with the gas to prevent crystal grows on an inside surface of the evaporator. The evaporator may comprise an outer tube and an inner tube having a polished inner surface and arranged inside the outer tube for passing the mixture of the liquid and the gas. A boiling refrigerant may be provided between the outer tube and the inner tube.

The rotating device may be arranged inside the inner tube for rotating the mixture passing through the inner tube to prevent crystal growth on the polished inner surface of the inner tube. The rotating device may comprise a rotatable shaft and plastic wipers arranged on the rotatable shaft.

In accordance with the method of the present invention, a liquid is mixed with a preselected gas for producing a mixture of the liquid with the gas. The mixture of the liquid with the gas is passed through at least one evaporator for performing three-dimensional crystallization of the mixture to produce ice crystals. The mixture passing through the evaporator may be rotated to prevent crystal grows on the inside surface of the evaporator.

According to a further aspect the invention, a method for liquid continuous volumetric crystallization by freezing comprising the following steps: cooling liquid of a predetermined chemical and physical composition; providing gas of a predetermined chemical and physical characteristics; intermixing of cooled liquid and gas having predetermined chemical and physical characteristics; passing above mentioned cooled liquid mixed with the gas being a fine bubble form through at least one evaporator; winding round stream of the cooled liquid mixed with the gas bubbles along axis of at least one tube-in-tube evaporator; cooling down of the liquid mixed with the gas bubbles (LMGB) layer adjacent to the evaporator's inside polished surface of the inside tube, the outer wall surfaces of which are in direct thermal contact with a boiling refrigerant; prevention of crystal nuclei growing on the inside polished surface of the evaporator's inside tube; removing of the cooled layer of LMGB from the evaporator's inside polished surface of the inside tube and to ship the cooled layer substantially uniformly throughout the entire volume of the evaporator; sub-cooling the entire volume of the evaporator filled by the cooled LMGB below crystallization temperature to reach natural volumetric crystal growing on the fine gas bubbles as centers of crystallization and conveyor working medium; removing grown crystals with fine gas bubbles (GCFGB) and concentrated liquid occupying the entire volume from the evaporator; boiling refrigerant as foam into the cavity between the evaporator's outside tube and inside tube, the inter wall surfaces of which are in direct convection thermal contact with a cooled LMGB; withdrawal refrigerant foam from the evaporator; destruction the refrigerant foam at subsequent superheating refrigerant vapor and return non-boiled liquid refrigerant into the cavity; compression with subsequent condensing of refrigerant vapor; storage liquid refrigerant with subsequent sub-cooling the liquid refrigerant before its throttling and supply into the evaporator's cavity; transportation the mixture of GCFGB and concentrated liquid, being a form of bubble slurry, for storage or separation GCFGB and concentrated liquid.

The invention further provides a method for liquid continuous volumetric crystallization by freezing comprising the following steps: pumping liquid of a predetermined chemical and physical composition through pre-cooling heat exchanger assembled into storage tank; cooling the liquid by thermal convection contact with inside surfaces of the pre-cooling heat exchanger, the outer wall surfaces of which are in direct thermal conductivity-convection contact with melted crystals being into the storage tank; propelling the cooled liquid from the heat exchanger; providing gas of a predetermined chemical and physical characteristics; intermixing of cooled liquid and gas having predetermined chemical and physical characteristics; passing the cooled liquid mixed with the gas being a fine bubbles form (LMGB) through at least one evaporator; winding round stream of the cooled LMGB along axis of at least one tube-in-tube evaporator; cooling down of the liquid mixed with gas bubbles layer adjacent to the evaporator's inside polished surface of the inside tube, the outer wall surfaces of which are in direct convection thermal contact with a boiling refrigerant; prevention of crystal nuclei growing on the inside polished surface of the evaporator's inside tube; removing of the the cooled layer of the LMGB from the evaporator's inside polished surface of the inside tube and to ship the cooled layer substantially uniformly throughout the entire volume of the evaporator; sub-cooling the entire volume of the evaporator filled by cooled liquid mixed with gas bubbles below crystallization temperature to reach natural volumetric crystal growing on the fine gas bubbles as centers of crystallization and conveyor working medium; removing GCFGB and concentrated liquid occupying the entire volume from the at least one evaporator; boiling refrigerant as foam into the cavity between the evaporator's outside tube and inside tube, the inter wall surfaces of which are in direct thermal convection contact with a cooled mixture of LMGB; withdrawal refrigerant foam from the at least one evaporator; destruction the refrigerant foam at subsequent superheating refrigerant vapor and return non-boiled refrigerant into exit part of the cavity; compression at subsequent condensing refrigerant vapor; storage liquid refrigerant at subsequent sub-cooling the liquid refrigerant before its throttling and supply into the evaporator's cavity; transportation the mixture of GCFGB and concentrated liquid, being a form of bubble slurry, to accumulation tank; separation GCFGB and concentrated liquid; withdrawing concentrated liquid from the accumulation tank for storage or further use; melting the separated GCFGB; circulation water from melted GCFGB into closed loop of the melted water distribution means, the accumulation tank, providing means and auxiliary heat exchanger; heating the circulated water from melted GCFGB passing through the auxiliary heat exchanger by thermal convection contact with heat transfer surfaces of the auxiliary heat exchanger, the outer wall surfaces of which are in thermal convection contact with a condenser water; circulation the condenser water into closed loop of cooling tower, condenser, providing means and the auxiliary heat exchanger; heating the condenser water which is passing through condenser's heat transfer means, the outer surfaces of which are in thermal convection contact with the condensed liquid refrigerant; cool down the condenser water by convection-conductivity heat transfer with the circulated water from melted GCFGB into the auxiliary heat exchanger and with environment air into the cooling tower.

The invention further provides a method for liquid continuous volumetric crystallization by freezing comprising the following steps: pumping liquid of a predetermined chemical and physical composition through pre-cooling heat exchanger assembled into storage tank; cooling the liquid by thermal convection contact with inside surfaces of the pre-cooling heat exchanger, the outer wall surfaces of which are in direct thermal conductivity-convection contact with melted crystals being into the storage tank; propelling the cooled liquid from the pre-cooling heat exchanger through heat exchanger-low pressure receiver (HE-LPR); additional cooling the cooled liquid by thermal convection contact with inside surfaces of the HE-LPR, the outer wall surfaces of which are in direct thermal convection contact with super heated refrigerant vapor sucked in compressor; propelling the cooled liquid from the heat exchanger; providing gas of a predetermined chemical and physical characteristics; intermixing of cooled liquid and gas having predetermined chemical and physical characteristics; passing the cooled liquid mixed with the gas being a fine bubbles form (LMGB) through at least one evaporator; winding round stream of the cooled liquid mixed with the gas bubbles LMGB along axis of at least one tube-in-tube evaporator; cooling down of the LMGB layer adjacent to the evaporator's inside polished surface of the inside tube, the outer wall surfaces of which are in direct convection thermal contact with a boiling refrigerant; prevention of crystal nuclei growing on the inside polished surface of the evaporator's inside tube; removing of the cooled layer of GCFGB from the evaporator's inside polished surface of the inside tube and to ship the cooled layer substantially uniformly throughout the entire volume of the evaporator; sub-cooling the entire volume of the evaporator filled by cooled LMGB below crystallization temperature to reach natural volumetric crystal growing on the fine gas bubbles as centers of crystallization and conveyor working medium; removing grown crystals with the fine gas bubbles and concentrated liquid occupying the entire volume from the at least one evaporator; boiling refrigerant as foam into the cavity between the evaporator's outside tube and inside tube, the inter wall surfaces of which are in direct thermal convection contact with a cooled mixture of liquid and the gas fine bubbles; withdrawal refrigerant foam from the at least one evaporator and passing into low pressure receiver assembled above the evaporator; destruction the refrigerant foam with subsequent heating refrigerant vapor by direct thermal convection contact with outside surfaces of refrigerant heat exchanger (RHE), assembled into the LPR and the inside surfaces of which are in direct thermal convection contact with high temperature liquid refrigerant passing from refrigerant receiver through the RHE to expansion valve for throttling; super heating the heated refrigerant vapor by indirect thermal convection-conductivity contact through heat transfer walls of HE-LPR with the high temperature liquid pumping to the evaporator; return non-boiled refrigerant into exit part of the cavity; compression with subsequent condensing refrigerant vapor; storage liquid refrigerant with subsequent sub-cooling the liquid refrigerant before its throttling and supply into the evaporator's cavity; transportation the mixture of GCFGB and concentrated liquid, being a form of bubble slurry, to accumulation tank; separation GCFGB and concentrated liquid; withdrawing concentrated liquid from the accumulation tank for storage or further use; melting the separated GCFGB; circulation water from melted GCFGB into closed loop of the melted water distribution means, the accumulation tank, providing means and auxiliary heat exchanger; heating the circulated water from melted GCFGB passing through the auxiliary heat exchanger by thermal convection contact with heat transfer surfaces of the auxiliary heat exchanger, the outer wall surfaces of which are in thermal convection contact with a condenser water; withdrawal pure water as a result of separated crystal melting from accumulation tank to storage or further utilization; circulation the condenser water into closed loop of cooling tower, condenser, providing means and the auxiliary heat exchanger; heating the condenser water passing through condenser's heat transfer means, the outer surfaces of which are in thermal convection contact with the condensed liquid refrigerant; cool down the condenser water by convection-conductivity heat transfer with the circulated water from melted GCFGB into the auxiliary heat exchanger and with environment air into the cooling tower.

In addition, the invention provides an installation for liquid continuous volumetric crystallization by freezing, comprising pumping means for propelling liquid from a supply system into refrigeration means for cooling liquid of a predetermined chemical and physical composition; providing means for producing gas of a predetermined chemical and physical characteristics; compression means for intermixing of cooled liquid and gas of a predetermined chemical and physical characteristics; delivering means for propelling through at least one tube-in-tube evaporator and winding round along axis of the evaporator of the cooled liquid mixed with the gas being a fine bubble form (LMGB) which are in indirect thermal convection-conductivity contact with refrigerant boiling in foam regime at the evaporator's refrigerant cavity; transportation means for removing grown crystals with fine gas bubbles (GCFGB) and concentrated liquid from the at least one evaporator to storage or further utilization; refrigeration closed circuit of phase transformation of refrigerant including compressor, water condenser, refrigerated evaporator, cooling tower, low pressure receiver, auxiliary refrigeration accessories to reach natural volumetric crystal growing on the fine gas bubbles as centers of crystallization into the evaporator and to prevent crystal growth on the inside cooling surface of inside tube of the evaporator.

The invention still further provides an installation for liquid continuous volumetric crystallization by freezing, comprising pumping means for propelling liquid of a predetermined chemical and physical composition from a supply system into pre-cooling heat exchanger, assembled into storage tank and in which the liquid is cooling by indirect thermal convection-conductivity contact with melted crystals being into the storage tank; providing means for propelling of the cooled liquid from pre-cooling heat exchanger; providing means for producing gas of a predetermined chemical and physical characteristics; compression means for intermixing of cooled liquid and gas of a predetermined chemical and physical characteristics; delivering means for propelling through at least one tube-in-tube evaporator and winding round along axis of the evaporator of the cooled liquid mixed with the gas being a fine bubble form (LMGB) which are in indirect thermal convection-conductivity contact with refrigerant boiling in foam regime at the evaporator's refrigerant cavity; transportation means for removing the mixture of grown crystals with fine gas bubbles (GCFGB) and concentrated liquid, being a bubble slurry form (BS), from the at least one evaporator to accumulation tank for natural separation by gravitational and buoyancy forces between GCFGB and concentrated liquid; level sensing means for control of filling and evacuation the storage and the accumulation tanks; pumping means for withdrawing concentrated liquid from the accumulation tank for storage or further utilization; heating circuit for melting the separated GCFGB including accumulation tank with pre-cooling heat exchanger by which melted crystals are in indirect thermal convection-conductivity contact with pumped warm liquid, delivering melted water means, auxiliary heat exchanger into which melted water is heating by indirect thermal convection-conductivity contact with hot condenser water, spraying melted water means assembled into the accumulation tank for acceleration melting of separated crystals; pumping means for withdrawing pure melted water from the accumulation tank for storage or further utilization; refrigeration closed circuit of phase transformation of refrigerant including compressor, water condenser, refrigerant boiling cavity of at least one evaporator, cooling tower, low pressure receiver, auxiliary refrigeration accessories to reach natural volumetric crystal growing on the fine gas bubbles as centers of crystallization into the evaporator to prevent crystal growing on the inside cooling surface of inside tube of the evaporator.

The invention still further provides an installation for liquid continuous volumetric crystallization by freezing, comprising pumping means for propelling liquid of a predetermined chemical and physical composition from a supply system into pre-cooling heat exchanger, assembled into storage tank and in which the liquid is cooling by indirect thermal convection-conductivity contact with melted crystals being into the storage tank; providing means for propelling of the cooled liquid from pre-cooling heat exchanger to heat exchanger-low pressure receiver (HE-LPR), assembled above the evaporator and closed to exit part of the evaporator and in which the liquid is additionally cooled by indirect thermal convection-conductivity contact with heated refrigerant vapor sucked to compressor; providing means for propelling of the cooled liquid from the HE-LPR; providing means for production gas of a predetermined chemical and physical characteristics; compression means for intermixing of cooled liquid and gas of a predetermined chemical and physical characteristics; delivering means for propelling through at least one tube-in-tube evaporator and winding round along axis of the evaporator of the cooled liquid mixed with the gas being a fine bubble form (LMGB) which are in indirect thermal convection-conductivity contact with refrigerant boiling in foam regime at the evaporator's refrigerant cavity; transportation means for removing the mixture of grown crystals with fine gas bubbles (GCFGB) and concentrated liquid, being a bubble slurry form (BS), from the at least one evaporator to accumulation tank for natural separation by gravitational and buoyancy forces between GCFGB and concentrated liquid; level sensing means for control of filling and evacuation the storage and the accumulation tanks; pumping means for withdrawing concentrated liquid from the accumulation tank for storage or further utilization; heating circuit for melting the separated GCFGB including accumulation tank with pre-cooling heat exchanger by which melted crystals are in indirect thermal convection-conductivity contact with pumped warm liquid, delivering melted water means, auxiliary heat exchanger into which melted water is heating by indirect thermal convection-conductivity contact with hot condenser water, spraying melted water means assembled into the accumulation tank for acceleration melting of separated GCFGB; pumping means for withdrawing pure melted water from the accumulation tank for storage or further utilization; refrigeration closed circuit of phase transformation of refrigerant including compressor, water condenser, refrigerant boiling cavity of at least one evaporator, cooling tower, heat exchanger-low pressure receiver, auxiliary refrigeration accessories to reach natural volumetric crystal growing on the fine gas bubbles as centers of crystallization into the evaporator and to prevent crystal growing on the inside cooling surface of inside tube of the evaporator.

BRIEF DESCRIPTION OF DRAWINGS

To fully understand the invention, it will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
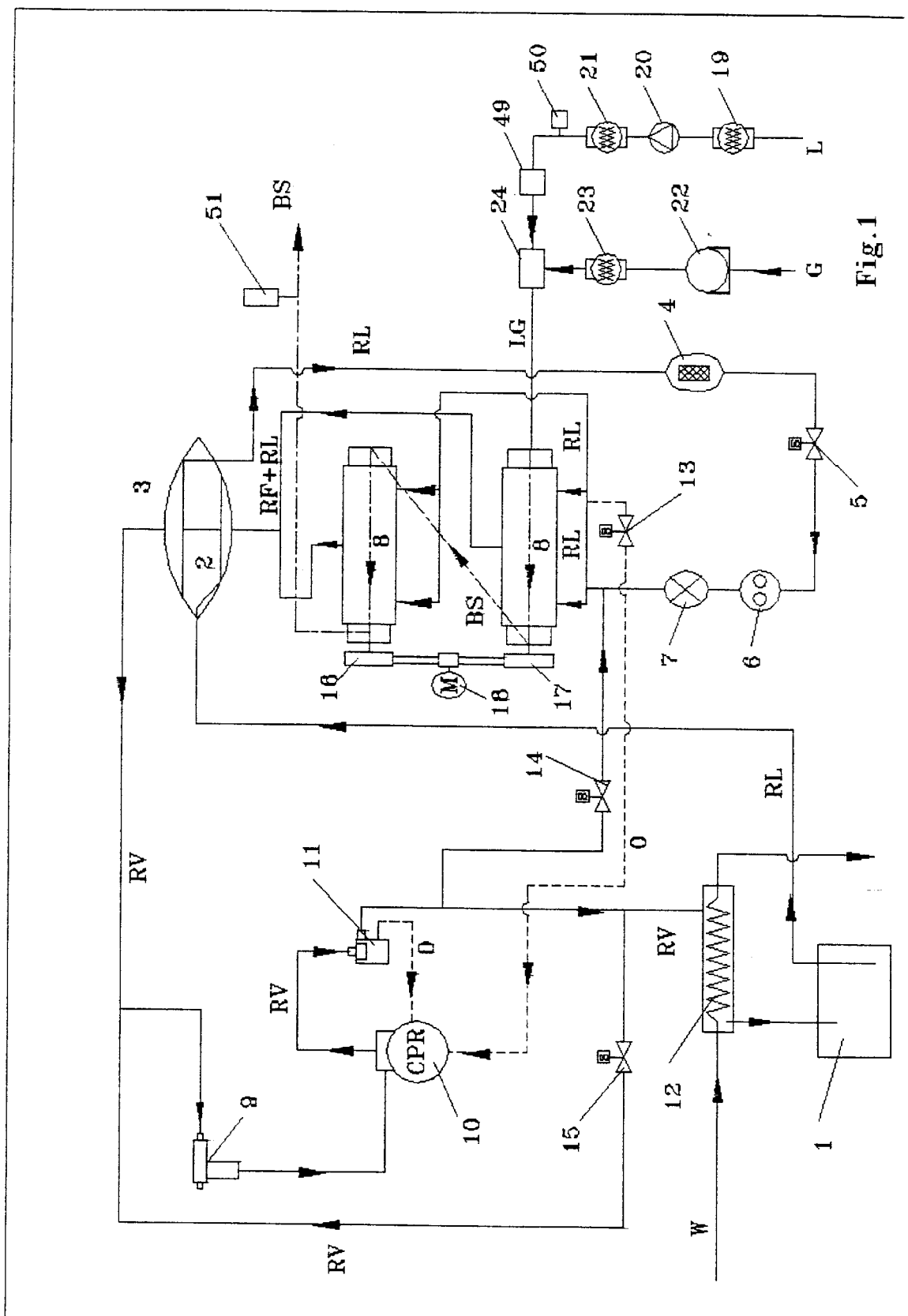
Figure 2:
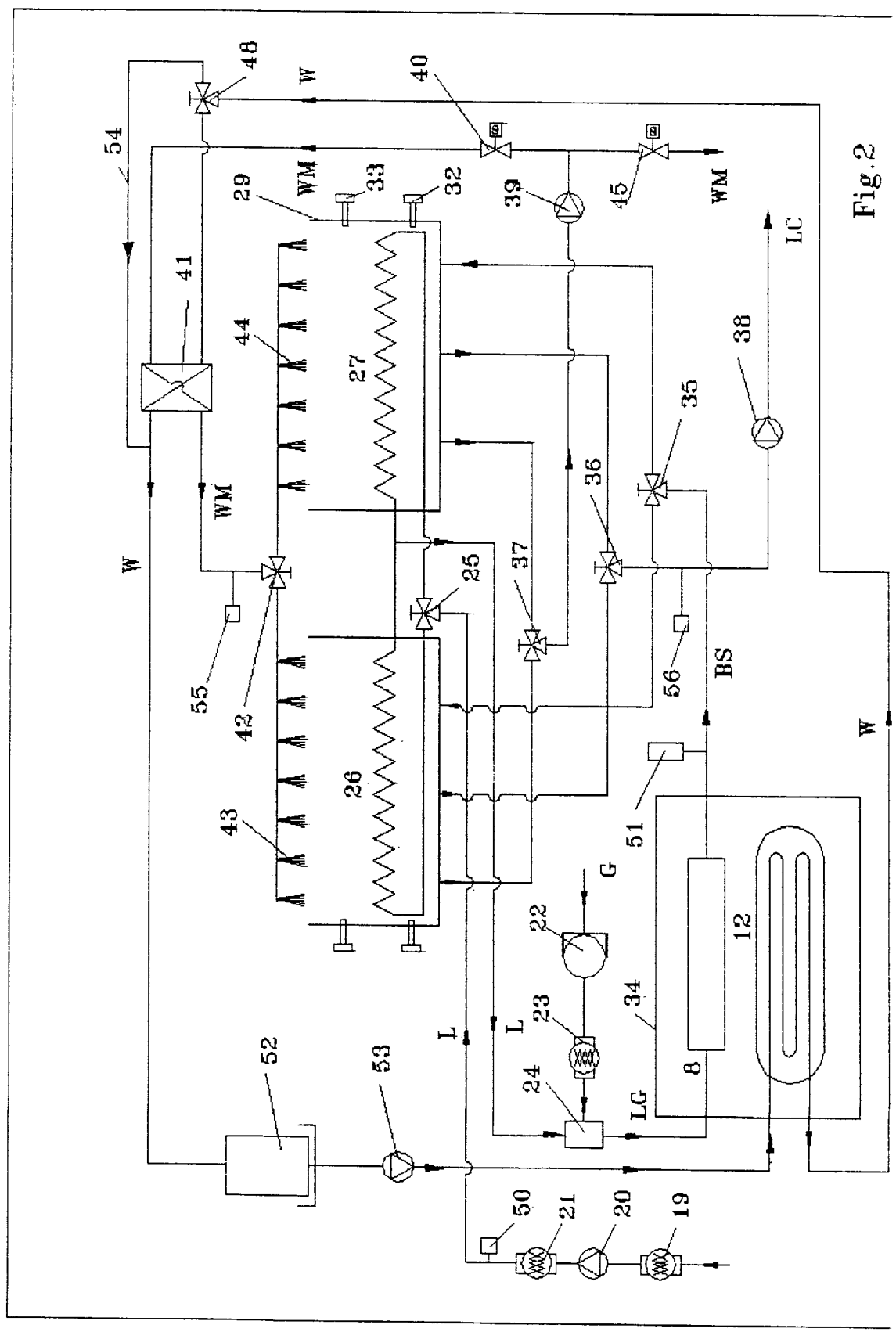
Figure 3:
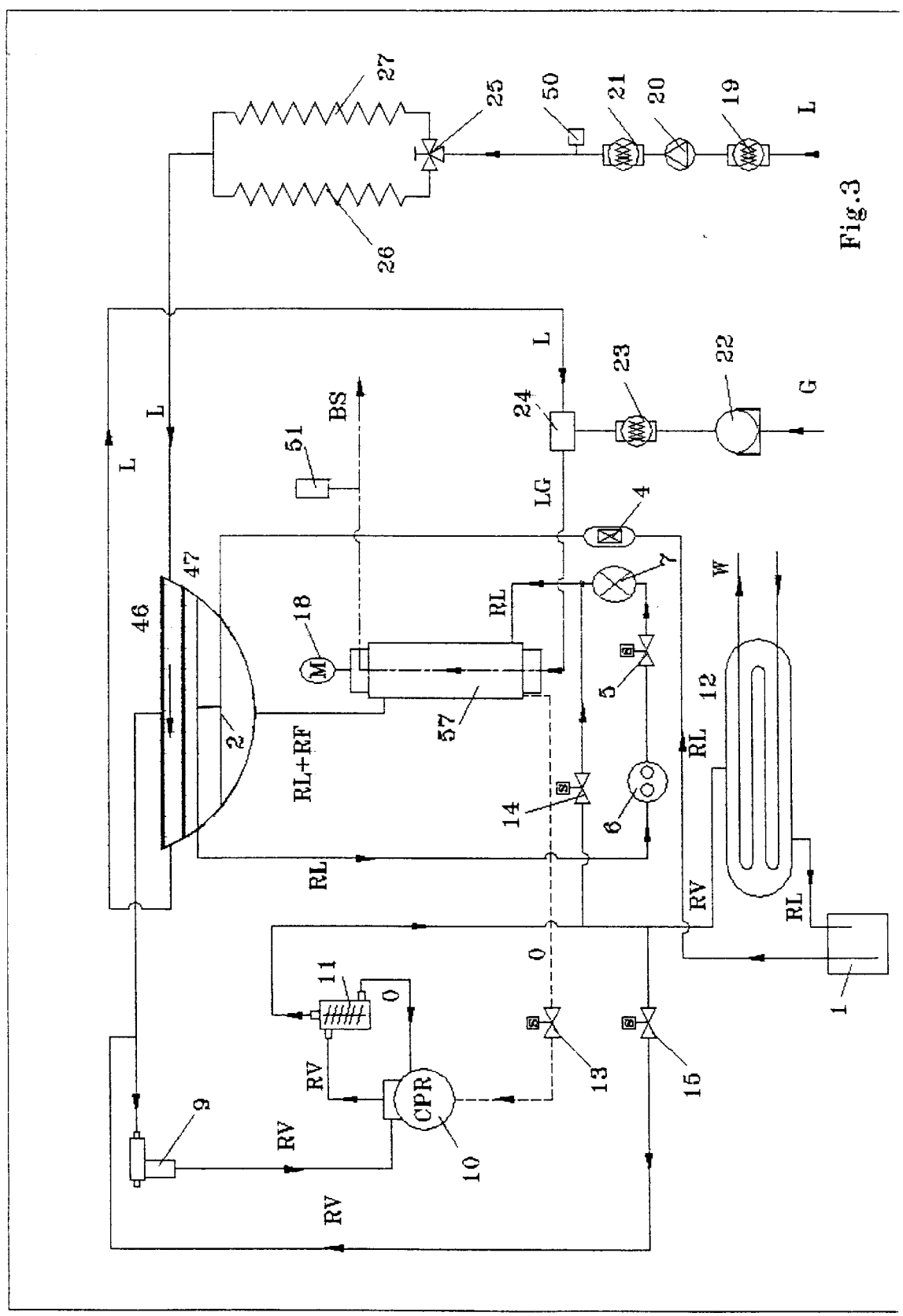
Figure 4:
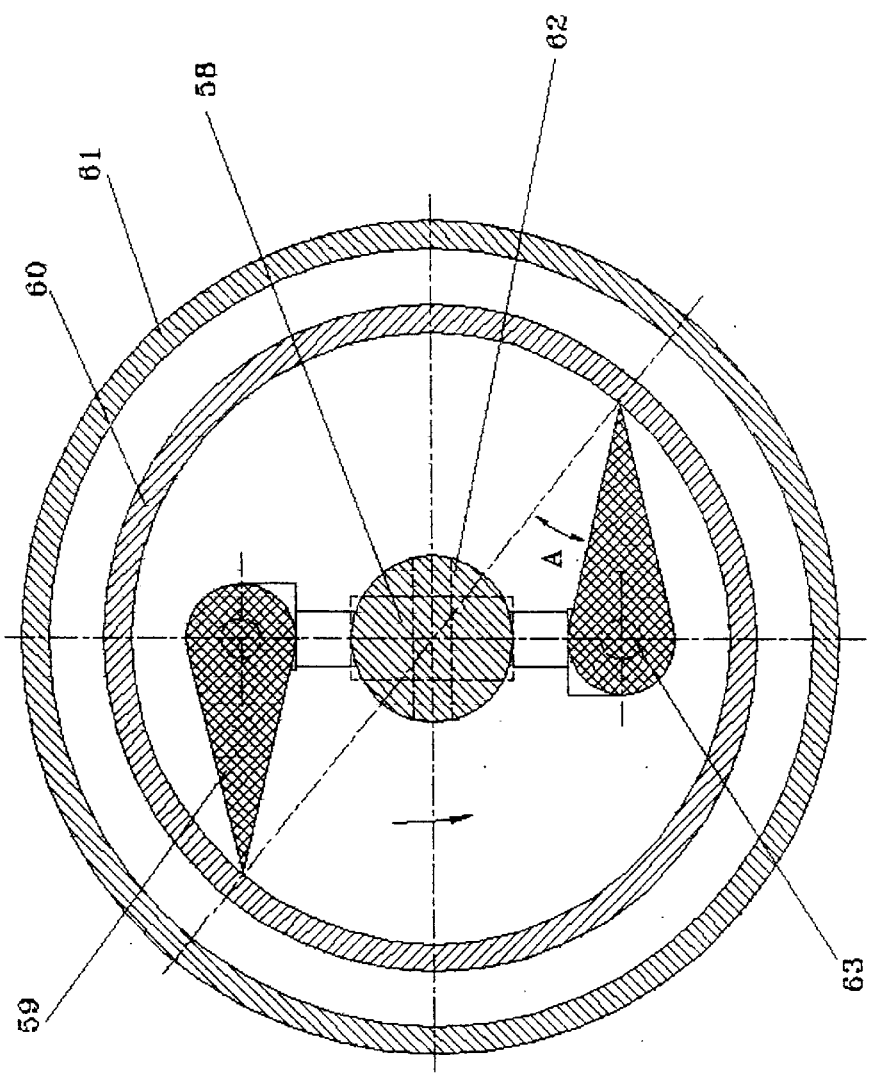

FIG. 1. is a refrigerant and liquid flows diagram of a first embodiment of the SSC installation with two horizontal tube-in-tube evaporators according to the invention;

FIG. 2. is a general layout and flow diagram of a second embodiment of the installation according to the invention;

FIG. 3. is a refrigerant and liquid flows diagram of a second embodiment of the SSC installation with one vertical tube-in-tube evaporator according to the invention;

FIG. 4. is a cross-sectional view of the evaporator of the installation according to the invention, and FIG. 5. illustrates a further embodiment of the evaporator according to the invention.

BEST MADE FOR CARRYING OUT THE INVENTION

To facilitate understanding of the following, it will be appreciated that the method and installation, according to the invention, use different working fluids which, as described below, are given the following designations, which apply also to the conduits carrying these fluids:

| Liquid | L |
| Gas | G |
| Liquid + Gas | LG |
| Refrigerant, liquid | RL |
| Refrigerant, vaporous | RV |
| Refrigerant, foam | RF |
| Crystals + Gas Bubbles | C |
| Liquid, concentrated | LC |
| Crystals + Gas Bubbles + Liquid, concentrated = BUBBLE SLURRY | BS |
| Water, condenser | W |
| Water, melted | WM |
| Oil | O |

It should be further noted that the term "liquid", as used herein, refers to a medium in which the solvent is water and the solute is any substance suitable for the intended purpose. In the method according to the invention, the solute may advantageously be common juice. Another possibility would be to use an ice cream mixture, any beer, wine, seawater, waste waters, or solution based on glycol or salt.

Referring to FIG. 1 of the drawings, there are a receiver 1 from which the liquid refrigerant RL is supplied to the evaporators 8 through a refrigerant heat exchanger 2 incorporated into low pressure receiver (LPR) 3, filter-dryer 4, solenoid valve 5, sight glass 6, thermal expansion valve 7.

A LPR 3 is arranged above evaporators 8. A refrigerant vapor RV is sucked to a compressor 10 through a pressure regulation valve 9. After passing an oil separator 11 the refrigerant vapor RV is returned to the liquid state RL through condenser 12. The liquid L is passed by pump 20 through coarse filter 19 and fine filter 21 to the evaporators 8. In order to keep the liquid L at a temperature close to its crystallization temperature prior to its introduction into the evaporators 8, the liquid L is cooled by independent chilling unit 49. The liquid L flow is controlled by flow switch 50. When the liquid flow ceases, the compressor will be switched off. The final temperature of liquid L is monitored by temperature sensor 51. Thermal expansion valve 7 maintains a constant temperature drop between the temperature of superheated refrigerant vapor RV after LPR and the temperature of liquid refrigerant RL before the thermal expansion valve 7. Also, FIG. 1 shows a first solenoid valve 5 arranged between filter-dryer 4 and sight glass 6, a second solenoid valve 13 between entrances of evaporators 8 and entrance of compressor 10, a third solenoid valve 14 between entrances of evaporators 8 and exit of oil separator 11, and a forth solenoid valve 15 between exit of oil separator 11 and entrance of pressure regulation valve 9.

The installation according to the invention as schematically illustrated in FIG. 1 is seen to comprise two separate, but thermally interacting circuits, a refrigerant circuit and a liquid circuit.

The refrigerant circuit includes a receiver vessel 1 in which the liquid refrigerant RL coming from condenser 12 is collected, a refrigerant heat exchanger 2, a low pressure receiver 3, a filter-dryer 4, a solenoid valve 5, a sight-glass 6, a thermal expansion valve 7, the boiling cavity of the evaporators 8 and solenoid valves 5, 13,14,15. Within the LPR, high temperature of outside surface of refrigerant heat exchanger 2 causes eliminating of the refrigerant foam RF supplied to the LPR 3 from the refrigerant cavities of evaporators 8 and producing vapors RV and liquid RL. The warm liquid refrigerant is cooled by the relatively cold refrigerant vapor RV and comes in at least one evaporator 8. Sub-cooling of the liquid refrigerant RL upstream of the thermal expansion valve 7 is advantageous, as it reduces throttling losses, thus increasing the specific cold capacity of the refrigerant liquid L. The liquid refrigerant RL produced by eliminating of the foam refrigerant RF is returned in every refrigerant cavity evaporator volume. The refrigerant vapor RV produced by eliminating of the foam refrigerant RF absorbs heat from the liquid refrigerant RL. As a result the refrigerant vapor RV becomes superheated. The compressor 10 causes the refrigerant vapor RV to be supplied into the condenser 12 through oil separator 11. Superheating of RV in LPR instead of evaporator's refrigerant cavity is advantageous, as it increases the effective cooling heat transfer surface of every evaporator 8, thus the summary cooling effect of the evaporators connected to LPR in parallel on the refrigerant side (from 2 to 18 units) is growing.

The LPR refrigerant circuit provides an overfeed of refrigerant to the evaporator without needing to use a pump. The refrigerant foam RF leaves the evaporator 8 in a wet condition and is destroyed and evaporated to dryness by contact with high temperature surface of refrigerant heat exchanger 2 assembled into LPR 3. As refrigerant liquid is continually present in the low-pressure side of LPR and as this refrigerant liquid can only be fed to the LPR through the evaporator 8, it follows that the evaporator 8 is operated in regime like flooded with subsequent foam regime of refrigerant boiling. Under steady conditions the mass flow of refrigerant liquid RL to the evaporator 8 is the same as that through the compressor 10. Evaporation to dryness does not take place in the evaporator 8.

In order to keep a constant maximum value of the film coefficient on the refrigerant side along all heat transfer surfaces, the refrigerant boils between two tubes of the evaporator 8. This produces a bubble of refrigerant vapor which starts restricted motion upward under the effect of gravitational and buoyancy forces. The moving bubble functions as a piston pushing upward the liquid refrigerant. Approaching the evaporator exit, the bubbles with a part of liquid refrigerant ("Refrigerant foam"—RF) go out from evaporator, and climb to LPR. They are eliminated by contact with a high temperature outside surface of the refrigerant heat exchanger 2, and the entrained liquid refrigerant RL is thrown down into the space between two tubes of at least one evaporator 8. For the most commonly used refrigerants (ammonia, freon 22, freon 134*a*, freon 502, freon 404*a*) when the clearance between two walls is less than 5 mm, the liquid refrigerant enters between two tubes in insufficient quantities and there it develops large spaces containing vaporized refrigerant which reduces the value of heat transfer between the foamed refrigerant and the tubes. It also causes the reduction of the heat transfer coefficient between refrigerant and LMGB. If the clearance exceeds 20 mm the large amount of refrigerant is circulated into refrigerant system, significant amount of refrigerant doesn't have time to absorb heat load from the solution side across heat transfer wall. It causes undesirable increase of heat load for compressor and accordingly growth of specific energy expenditure per one metric ton crystal production. Decrease of circulated refrigerant mass in LPR system with foam regime of the refrigerant boiling is a significant advantage. The refrigerant charge can be the minimum possible in comparison with dry expansion systems, pump circulated refrigerant systems and the conventional known fully-flooded evaporator systems. The specific refrigerant consumption of the LPR system with foam regime of the refrigerant boiling can reach 1.2–1.3 kg/TR (ton of refrigeration) in comparison with the specific refrigerant consumption of the current known systems realizing a freezing process of liquid equaled 3–10 kg/TR.

In order to organize the effective foam regime of refrigerant boiling in the evaporator 8 it is necessary to maintain LPR over the evaporator 8 at the predetermined low height. Due to that, one may prevent a depression of a refrigerant boiling by a hydrostatic post of liquid refrigerant. This height is less than 400 mm. In that case, the summary hydraulic resistance between the evaporator entrance and LPR will be 3.5÷10.0 kPa which corresponds to the evaporating temperature drop along the evaporator of 2 meters height (0.3÷0.7)° C. For the conditions mentioned above, the refrigerant foam boiling is realized.

Return of oil from evaporator 8 is of great importance. It is explained by the fact the film transfer coefficient between refrigerant and oiled surface is very low. Modern oil separators can achieve high efficiencies with carryover rates of less than 10 ppm. But no matter how efficient the separator 11 is, some oil will always get past it and through condenser 12, receiver 1, refrigeration accessories, oil gets into evaporator 8. Part of oil in evaporator, aspirated with refrigerant vapor by the compressor, is forced via pressure regulation valve 9 and oil separator 11 into crankcase of compressor 10. In order to move away oil from evaporator 8 in full there is the following algorithm. The solenoid valve 5 closes the refrigerant liquid supply to the evaporator 8. During the following two minutes a solenoid valve 14 is opened. The refrigerant boiling cavity of evaporator 8 is heated by hot compressed gas. This gas is passed through the evaporator 8, LPR 3, pressure regulation valve 9 and comes back to the compressor 10. Then, a solenoid valve 14 is closed, solenoid valves 13 and 15 are opened. During 30 seconds the heated oil is squeezed out from evaporator by high pressure compressed refrigerant vapor RV. Oil is passed through solenoid valve 15, LPR 3,. refrigerant boiling cavity of evaporator 8, solenoid valve 13 to the crankcase of compressor 10.

In order to eliminate completely a refrigerant foam, to decrease a volume of the LPR 3 and to ensure that non-boiled liquid refrigerant RL will be accumulated in the lowest place of LPR bottom and returned uniformly to the exit part of refrigerant boiling cavity of evaporators 8 connected to LPR 3 in parallel on the refrigerant side, a lens type form of LPR is used. Any part of foam refrigerant passing throw LPR 3 will be in contact with a double spiral type refrigerant heat exchanger 2 and will be eliminated. It is not needed for any current expensive refrigerant distributors.

The liquid circuit includes pump 20, coarse filter 19, fine filter 21, independent chilling unit 49, mixer 24 for mixing cooled liquid L and gas G produced by gas compressor 22, gas filter 23, flow switch 50, liquid cavities of evaporators 8, motor 18 with revolved shafts and washers 16 and 17, bubble slurry temperature sensor 51.

In order to keep the maximum film heat transfer coefficient between the inside cooling surface of the inside evaporator's tube and the LMGB layer adjacent to the cooling surface with the subsequent cool down of the cooled LMGB layer and subsequent prevention of crystal nuclei grow into the cooled LMGB layer, it is needed to arrange the following operations supplementing each other: to support a "soft" temperature working regime of evaporator; to wind round along axis of the evaporator of the LMGB flow; to decrease the amount of feasible crystallization centers on the inside cooling surface of the inside evaporator's tube; to restrict a maximum value of heat flux from a boiled foamed refrigerant to cool treated LMGB.

"Soft " regime means a small temperature drop between an initial temperature of LMGB at the entrance of evaporator, a crystallization temperature of the cool treated liquid and a refrigerant evaporating temperature. If an initial temperature of LMGB at the entrance of evaporator is higher than a crystallization temperature of the cool treated liquid more than 2° C., a significant part of the "expensive" cooling surface will be loosed for the continuation of LMGB cooling down. With an entering temperature of the LMGB which is near to a crystallization temperature of the cool treated liquid there is a high value probability of crystal nuclei grow in the cooled LMGB layer adjacent to the inside cooling surface of the inside evaporator's tube. By the same reason, a temperature drop between a crystallization temperature of the cool treated LMGB and a refrigerant evaporating temperature must be less 16° C.

The turbulent regime arises in the cooled LMGB layer adjacent to the inside cooling surface of the inside evaporator's tube at the Reynolds number 400. It corresponds to the value of revolution per minute (RPM) of the plastic wipers into the inside evaporator's tube of the (0.05–0.25) meter inside diameter, equaled 400. In addition, the wipers tend to move the cooled LMGB layer in a spiral path towards the longitudinal central axis of the inside tube. The cooled and moved LMGB layer is mixed with general mass of LMGB passed through the inside tube. Within the limits of the duration of the cooled mixed LMGB mass passing along the inside tube the average temperature of the LMGB mass is decreased below the crystallization temperature of the cool treated liquid. It causes the initiation of the LMGB mass volumetric crystallization on the fine gas bubbles as centers of crystallization. Because the crystallization temperature of pure water is the highest in comparison with any water-based liquids (pure water with dissolved or added precipitates), the centers of crystallization will be built from the pure water molecules. By that any dissolved precipitate molecules move from the zone of the crystallization. Due to the crystals don't contain dissolved precipitates, the molecules of the dissolved substances are accumulated on the interface between frozen and unfrozen phases. The produced precipitate clusters have a crystallization temperature lower than frozen pure water. Thus the liquid with the higher concentration of the dissolved precipitates promotes diffuision of pure water to the surface of crystal. Then the formation of pure water crystals is continued. Upper limits of the plastic wipers RPM is depended on relationships between different physical, mechanical and thermodynamics parameters of interacting mediums—LMGB, evaporator tube and wiper materials. It means velocity and viscosity of liquid and gas, pump motor and revolved shaft with wipers motor power, kind of heat transfer materials, compressor motor power, number of washers. For instance, a compressor motor power is decreased if evaporating temperature goes down. It causes increasing of value probability of crystal nuclei grow in the cooled LMGB layer adjacent to the inside cooling surface of the inside evaporator's tube. By that, it is needed to increase the revolved shaft with wipers RPM. On the other side, increase the revolved shaft RPM causes sharp increase of the friction force between the wipers and the cooled surface. For a lot of materials used for refrigerated evaporators and different kinds of liquids the rational upper limit of the shaft with plastic wipers RPM equals 1,000.

In order to decrease the amount of feasible crystallization centers on the inside cooling surface of the inside evaporator's tube one must have an inside surface roughness Ra of 1.0 microns. With the roughness Ra, a probability of crystal nuclei grow in the cooled LMGB layer adjacent to the inside cooling surface of the inside evaporator's tube will be very low that wipers are enough at the shaft with wipers RPM to remove the cooled LMGB layer from the cooling surface with subsequent prevention of crystal nuclei grow into the cooled LMGB layer.

The amount of feasible crystallization centers on the inside cooling surface of the inside evaporator's tube is dependent not only from the value of the roughness Ra, kind of the evaporator tube material and the temperature working regime of the evaporator. For widely used materials of the refrigerated evaporator, for realized in practice the temperature working regimes and the value of revolved shaft with wipers RPM, for economically advisable value of the cooling surface roughness Ra, the maximum heat flux value by which it is possible to prevent crystal nuclei grow in the cooled LMGB layer adjacent to the inside cooling surface of the inside evaporator's tube, equals 60 kW/m$^2$.

Preliminary intermixing by mixer 24 of the cooled liquid and gas having predetermined chemical and physical characteristics before passing through the evaporator 8, promotes increase of dispersed phase heat transfer surface of the cooled liquid, increases a film coefficient between the cooling surface of the inside tube and LMGB, intensifies three-dimensional (volumetric) crystal nuclei formation (crystallization process) on the gas bubbles as centers of crystallization and conveyer medium, into the evaporator, prevents the clogging of the through-passage of at least one the evaporator cross-section and accelerates carrying out of GCFGB and concentrated liquid. In addition, the specific power expenditure for removing the cooled LMGB layer from the cooling surface, winding round stream of the GCFGB and concentrated liquid, and removing GCFGB and concentrated liquid occupying the entire volume from the at least one evaporator, is sharply decreased (by a factor of more than two). The produced crystals have a smooth texture.

Low gas flow rate doesn't prevent the clogging of the entire volume of the evaporator inside tube. Increase of gas flow rate causes higher concentration of bubbles in the specific volume of LMGB and promotes intensification of volumetric formation of crystal nuclei and easy transportation of the bubble slurry along the evaporator and through supply pipes. But if the gas flow rate is too drainage of the GCFGB and concentrated liquid, bubble slurry mass occurs within the evaporator, and the dried-out GCFGB mass causes stopping of rotor's motor because of its current increase. Rational gas flow rates (L/h) are into the range of 10–60% of the pumped liquid flow (L/h).

Liquids are inertia systems in which their response (any structure and properties changes) to the outward influence (mechanical, electrical, temperature) are realized not immediately but during specified time mode. By that, in order to initiate the volumetric crystallization into propelled the volume of the cool treated LMGB it is needed to restrict the LMGB flow rate through the evaporator. A minimum time mode of the cool and freeze treatment of the LMGB into the evaporator equals 15 seconds.

The installation, schematically illustrated in FIG. 2 and using the above-mentioned SSC, can be modified for continue utilization of the effect of natural separation between produced the grown crystals with fine gas bubbles (GCFGB) and the concentrated liquid by gravitational and buoyancy forces without additional centrifuge means, wash columns.

A lot of technological steps described in connection with FIG. 1 for preparation LMGB and production BS are the same. The main distinctions are the follows. Liquid of a predetermined chemical and physical composition is cooled by pre-cooling heat exchangers 26 assembled into storage tank 28. Cooling process of the liquid is realized by thermal convection contact with inside surfaces of the pre-cooling heat exchanger 26, the outer wall surfaces of which are in direct thermal conductivity-convection contact with melted crystals being into the storage tank 26. The cooled liquid is passed through mixer 24, by which it is mixed with the gas, to the evaporator 8. The produced BS goes in the accumulation tank 27 through a three-way valve 35. Stopping of a filling up of the tank 27 is monitored by the level sensing means 33. At the same time GCFGB are melting in the tank 26. In order to accelerate a melting process of the GCFGB the following closed circuit is switched on: three-way valve 37, pump 39, solenoid 40, auxiliary heat exchanger 41, three-way valve 42, distribution means 43. Circulated water from melted GCFGB is heated in the auxiliary heat exchanger 41 by indirect thermal convection-conductive contact with warm condenser water. The closed loop of the condenser water is: cooling tower 52, pump 53, condenser 12 of the SSC 34, three-way valve 48, auxiliary heat exchanger 41 or bypass piping 54 of the auxiliary heat exchanger 41. The value of energy, absorbed by the condenser water, is higher always than the same accumulated in GCFGB. By that it is lightly to adept the time mode of the filling up of the accumulation tank 27 and time mode, required for melting of the GCFGB being into the tank 26 and for withdrawing the melted water from the tank 26 through three-way valve 37, pump 39, solenoid valve 45 for further utilization. The beginning of the withdrawing of the melted water is defined according to the temperature of the melted water by temperature sensing means 55. The end of the withdrawing of the melted water is defined according to level sensing means 30. After this moment the treated liquid is passed through three-way valve 25 to pre-cooling heat exchanger 27 and the BS is passed through three-way valve 37 to the tank 26. At the same time in the tank 27 the separation process between GCFGB and the concentrated liquid is realized during several minutes due to gravitational and buoyancy forces. The concentrated liquid is withdrawn from the tank 27 through three-way valve 36, pump 38 for further utilization or storage. The stop of the concentrated liquid withdrawing from the tank 27 is defined by flow indication means 56. The GCFGB, being in the tank 27, are melted as the same in the tank 26. Produced the melted water being in the tank 27 is withdrawn from the tank as the same in the tank 26. From this moment the cycle of production and further utilization of BS is repeated.

A different diagram is shown on FIG. 3. In comparison with FIG. 2, the additional pre-cooling of the cool treated liquid passed through pre-cooling heat exchangers 26, 27, is realized into heat exchanger-low pressure receiver HE-LPR 46,47 by indirect thermal convection-conductivity contact with heated refrigerant vapor sucked to compressor 10. This configuration ensures the additional defense of compressor 10 in case of sudden liquid refrigerant splashing out from low pressure receiver 47.

Use of additional evaporators connected with the evaporator 57 on the liquid side in series and on the refrigerant side in parallel with one HE-LPR 46,47 promotes very satisfactory specific energy expenditure per, for example, one metric ton of produced ice cream equaled 31 kWh in comparison with 54–110 kWh of current ice cream freezers.

Due to the described technological and technical decisions, the construction of the revolved shaft 62 with non spring loaded plastic wipers 59 is simplified (FIG. 4). The revolved shaft 62 is disposed in the refrigerated evaporator 8 (horizontal type) or 57 (vertical type) having the inside tube 60 and the outside tube 61. Between the two tubes 60, 61 refrigerant is boiled as foam. On the shaft 62 the pins 58 are assembled. At the ends of the pins 58, the freely swinging (non spring loaded) wipers 59 are supported on the spindles 63. When the shaft 62 revolves, the freely swinging wipers 59 hug the inside cooling surface of the inside tube 60 without clearance between outer edges of the wipers 59 and the cooling surface. The full contact between the freely swinging wipers 59 and the inside cooling surface of the inside tube 60 is supported by the following realizations supplementing each other: selection of revolution per minute (RPM) of the shaft 62 and value of attack angle A (between the diameter of the inside tube 60 and inter edges of the wipers 59), level of roughness Ra, material and amount of the wipers 59.

With low RPM the centrifugal force is not enough in order to clasp the wipers 59 continuously to the cooling surface because of casual pressure drops of the hydrodynamics fluctuations before and behind the wipers 59. The mistaken high value of the attack angle A increases only sporadic character of a breach of the contact between outer edges of the wipers 59 and the cooling surface. At low value of the attack angle A and high RPM the friction forces between two the interaction bodies of wipers 59 and inside tube 60 significantly rise. The engineering reasonable limits of the values of attack angle A and RPM are consequently: (15 40)° and (400 1000) RPM.

If Ra is more than one micron, the amount of feasible crystallization centers (micro pores and micro splits) is high and the cohesion mechanical forces are comparable with molecular forces between crystal nuclei and the cooling surface material. Freezing into micro pores and micro splits, frozen water is expanded and squeezes a neighbor micro cavity which, in one's turn, squeezes the neighbor micro cavities too. The total area of a contact between crystals and tube's material is increased, by that a value of the adhesion forces rises.

The full contact between the freely swinging wipers 59 and the inside cooling surface of the inside tube 60 is reachable on conditions that, the first, a hardness of the wiper's material is lower than a hardness of the tube's material (like plastic as Teflon), the second, realization of the preliminary grinding of the wipers to the tube's surface which are revolved into the inside tube 60 in the presence of 5% salt solution during several hours. The duration of the grinding mode is sharply decreased if a number of the wipers 59 assembled along axis of the inside tube 60 will be not less than calculated according to the following equation: "integer of [length of evaporator in mm/200 mm]+1".

The embodiment shown in FIG. 4 can be modified with hollow revolved shaft as indicated in FIG. 5. Owing to the hollow shaft 64, a cross-section area of the inside tube 60 is decreased. The linear velocity along the cooling surface of cool treated LMGB rises. It prevents any feasible accumulation of minor amounts of LMGB or risk of bacteria growth on the revolved shaft 64 with the freely swinging wipers 59. The isosceles wing form of the wipers 59 promotes to increase a period of the wiper use. If the outer edges of the wipers 59 will be rub, the wipers 59 will be re-equipped with inter edges touching the cooling surface of the inside tube 60. In order to support continuous regime of liquid volumetric crystallization and BS production without clogging of the cross-section area of the tube 60, the distance between outside surface of the hollow shaft 64 and inside cooling surface of inside tube 60 must be larger than a value according to equation "[length of evaporator in mm/outside diameter of shaft in mm]×2 mm". In addition, energy expenditure of liquid pumping through the evaporator's tube 60 rises significantly if the distance is less value according to the equation.

Apart from the stated object of invention, it can also be used for concentration of liquids and suspensions, such as juice, beer, wine etc., in air-conditioning, cool food storage systems, cooling of supermarket counters, pharmaceutics, waste water treatment, for desalination of sea water, for fish and poultry processing. It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A system for providing continuous three-dimensional crystallization of liquid, comprising:

a liquid supply circuit for supplying the liquid, a mixer supplied with the liquid and a predetermined gas for producing a mixture of the liquid with the gas, and a crystallizer supplied with the mixture of the liquid and the gas for performing three-dimensional crystallization of the mixture to produce ice crystals, the crystallizer comprising at least one evaporator having an outer tube and an inner tube arranged inside the outer tube for passing the mixture of the liquid and the gas, and including a rotating device arranged inside the inner tube for rotating the mixture of the liquid with the gas passing through the inner tube, the rotating device including a rotatable shaft, and at least one wiper arranged on the rotatable shaft contacting the inner tube and having an outer edge and an inner edge, the outer edge being arranged closer to a surface of the inner tube than the inner edge, an attack angle between the inner edge of the wiper and a diameter of the inner tube being selected in a predetermined range to prevent crystal grows on an inside surface of the evaporator.

2. The system of claim 1, wherein a boiling refrigerant is provided between the outer tube and the inner tube.

3. The system of claim 2, wherein the inner tube has a polished inner surface.

4. The system of claim 1, wherein the liquid supply circuit comprises a cooling device for pre-cooling the liquid before supplying the liquid to the mixer.

5. A method of providing continuous three-dimensional crystallization of liquid, comprising the steps of:

mixing the liquid with a predetermined gas for producing a mixture of the liquid with the gas, passing the mixture of the liquid with the gas through at least one evaporator for performing three-dimensional crystallization of the mixture to produce crystals, the evaporator having an outer tube and an inner tube arranged inside the outer tube, and the mixture of the liquid with the gas being passed through the inner tube, rotating the mixture of the liquid with the gas using a rotating device having rotatable shaft, and at least one wiper arranged on the rotatable shaft contacting the inner tube and having an outer edge and an inner edge, the outer edge being arranged closer to a surface of the inner tube than the inner edge, and selecting an attack angle between the inner edge of the wiper and a diameter of the inner tube in a predetermined range to prevent crystal grows on an inside surface of the evaporator.

6. The method of claim 5, wherein a boiling refrigerant is provided between the outer tube and the inner tube.

7. The method of claim 5, further comprising the step of pre-cooling the liquid carried out before the step of mixing the liquid with the gas.

8. An installation for liquid continuous volumetric crystallization by freezing, comprising:

pumping means for propelling liquid from a supply system into refrigeration means for cooling liquid of a predetermined chemical and physical composition;

providing means for producing gas of a predetermined chemical and physical characteristics;

compression means for intermixing of cooled liquid and gas of a predetermined chemical and physical characteristics;

delivering means for propelling through at least one tube-in-tube evaporator and winding round along axis of the evaporator of the cooled liquid mixed with the gas being a fine bubble form (LMGB) which are in indirect thermal convection-conductivity contact with refrigerant boiling in foam regime at the evaporator's refrigerant cavity;

transportation means for removing grown crystals with fine gas bubbles (GCFGB) and concentrated liquid from the at least one evaporator to storage or further utilization;

refrigeration closed circuit of phase transformation of refrigerant including compressor, water condenser, refrigerated evaporator, cooling tower, low pressure receiver, auxiliary refrigeration accessories to reach natural volumetric crystal growing on the fine gas bubbles as centers of crystallization into the evaporator and to prevent crystal growth on the inside cooling surface of inside tube of the evaporator, wherein the low pressure receiver is in a lens type form.

9. The installation as claimed in claim 8, wherein there is a plurality of the evaporators, which are assembled to only one low pressure receiver in parallel on refrigerant side and between themselves in series on liquid side.

10. The instalation as claimed in claim 8, wherein the roughness level Ra of the evaporator inside surface, which is in contact with cooled liquid mixed with gas bubbles is less than 1.0 micron.

11. The installation as claimed in claim 8, wherein the clearance, between two heat transfer surfaces of inside and outside tubes of at least one refrigerated evaporator, intended for a foam refrigerant boiling is between 5.0 mm and 20 mm.

12. The installation as claimed in claim 8, wherein separation of refrigerant vapor and liquid refrigerant and transformation of a refrigerant foam into the liquid refrigerant are provided at the distance no more than 400 mm above at least one evaporator.

13. The installation as claimed in claim 8, wherein a revolution per minute of a revolved shaft with non-spring loaded plastic wipers is between 400 and 1000.

14. The installation as claimed in claim 8, wherein a value of attack angle between the diameter of the inside tube of refrigerated tube-in-tube type evaporator and inter edges of plastic freely swinging wipers of isosceles wing form is between 15° and 40°.

15. The installation as claimed in claim 8, wherein a number of plastic freely swinging wipers of isosceles wing form assembled along axis of inside tube of refrigerated tube-in-tube type evaporator is not less than a value equal to integer of [length of evaporator in mm/200 mm]+1.

16. The installation as claimed in claim 8, wherein a clearance between outside surface of revolved hollow shaft with plastic freely swinging wipers and inside cooling surface of inside tube of refrigerated tube-in-tube type evaporator is larger than a value equal to (length of evaporator in mm/outside diameter of shaft in mm)×2 mm.

17. The system of claim 1, wherein the attack angle is selected in the range between 15° and 40°.

18. The system of claim 17, wherein a rotation rate of the shaft is further selected in a predetermined range to prevent crystal grows on the inside surface of the evaporator.

19. The system of claim 18, wherein the rotation rate is selected in the range between 400 and 1000 revolutions per minute.

20. The method of claim 5, wherein the attack angle is selected in the range between 15° and 40°.

21. The method of claim 20, further comprising the step of selecting a rotation rate of the shaft in a predetermined range to prevent crystal grows on the inside surface of the evaporator.

22. The method of claim 21, wherein the rotation rate is selected in the range between 400 and 1000 revolutions per minute.

* * * * *